United States Patent [19]

Hallerbäck

[11] 4,130,399

[45] Dec. 19, 1978

[54] DISMANTLING TOOL

[75] Inventor: Stig L. Hallerbäck, Göthenburg, Sweden

[73] Assignee: Aktiebolaget SKF, Gothenburg, Sweden

[21] Appl. No.: 828,897

[22] Filed: Aug. 29, 1977

[30] Foreign Application Priority Data

Oct. 6, 1976 [SE] Sweden ................................ 7611055

[51] Int. Cl.[2] ................................................ B23P 19/04

[52] U.S. Cl. ........................................ 29/225; 29/259; 29/263

[58] Field of Search ................. 29/225, 229, 230, 256, 29/258, 259, 263, 262, 261, 260, 283.5, 235

[56] References Cited

U.S. PATENT DOCUMENTS

| | | | |
|---|---|---|---|
| 1,394,129 | 10/1921 | Wickersham | 29/261 |
| 2,171,910 | 9/1939 | Blackwood | 29/261 |
| 2,188,074 | 1/1940 | Condon | 29/261 |

*Primary Examiner*—James L. Jones, Jr.
*Attorney, Agent, or Firm*—Eugene E. Renz, Jr.

[57] ABSTRACT

A tool for dismantling a locking ring consisting of an annular portion having a plurality of radially projecting circumferentially spaced locking tongues for supporting a bearing element such as a ring in an opening in a housing or the like. The annular portion of the locking ring seats against the axial end face of the bearing element and the tongues wedge against the sidewall of the housing at an angle. The dismantling tool comprises a generally disc-like member having a circumferential rib depending from one axial face thereof adapted to abut the annular portion of the locking ring radially inwardly of the locking tongues. An outer member overlies the disc-like member and has a depending flange closely circumscribing the outer sidewall of the disc member of a diameter slightly smaller than the opening in the housing. The outer member has a plurality of circumferentially spaced teeth with gripping elements adapted to engage through the spaces between tongues of the locking ring and upon rotation confront the back of the tongues and means for axially displacing the gripping member axially relative to the disc whereby the gripping elements of the teeth deform the tongues upwardly to release them from engagement with the sidewall of the opening in the housing.

2 Claims, 4 Drawing Figures

DISMANTLING TOOL

BACKGROUND OF THE INVENTION

The present invention refers to a tool for dismantling locking rings.

Different types of locking rings are known. A common type of such rings comprises a resilient ring, which can be compressed in such a manner that it will have a somewhat smaller diameter as compared to its uncompressed state. This type of locking ring usually cooperates with a groove turned in a lathe and in which the locking ring is inserted and where it is allowed to unstress. In order to dismantle such a ring is required only a pair of tongs or the like, which can pull the two ends of the ring against each other, whereby the diameter of the ring is reduced and the ring can be removed.

Another type of locking ring consists of a continuous ring, which cannot be compressed but which is provided with locking tongues, which grip into the surrounding material. These tongues are bent somewhat outwards and will thereby lock the ring. A disadvantage at these locking rings which otherwise are excellent is that they cannot be pulled away without damaging the material to which they are clamped or without self being deformed.

This type of rings are consequently used only at such assemblies where they are intended to remain during the entire life of the machine member.

SUMMARY OF THE INVENTION

The present invention has removed the drawbacks at the last mentioned type of locking ring and has provided a dismantling tool, which is characterized thereby that is comprises two members, which are axially and angularly moveable in relation to each other, a first one of said members being designed as a stop intended for engagement against the portion of the locking ring radially inside the locking tongues, whereas the second member is designed to grip around the first member and is provided with grabbing teeth, which can be inserted below the locking tongues and that clamping means are arranged for displacement of the members relative to each other.

The clamping means for displacing the members from each other can consist of one or more threaded bolts or screws. For some appliances it can be suitable to have a hydraulic clamping means.

DESCRIPTION OF THE DRAWINGS

The invention will hereinafter be further described with reference to the accompanying drawings, in which.

DESCRIPTION OF A PREFERRED EMBODIMENT

Figure 1:
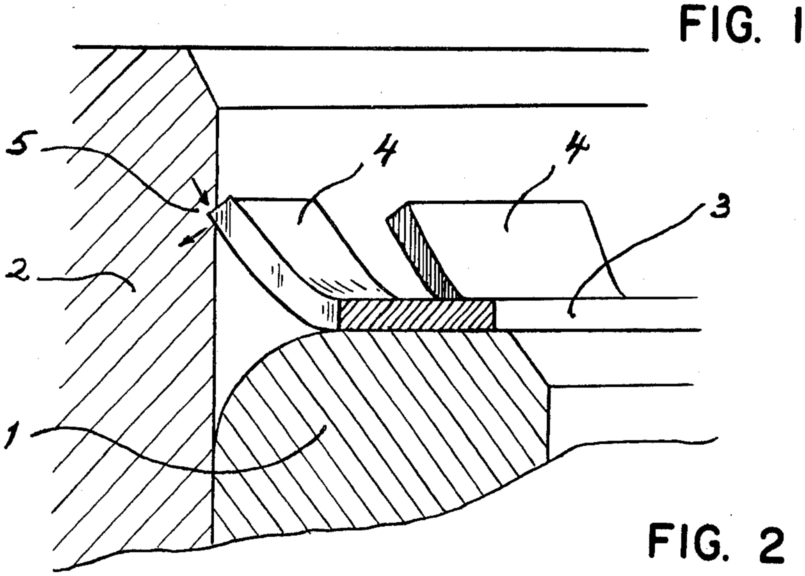
FIG. 1 shows the locking ring prior to dismantling.

In FIG. 1 is shown an outer ring 1 of a bearing mounted in a bearing seat 2. The locking ring 3 has been inserted for attachment of the outer ring which locking ring includes a plurality of locking tongues 4. These tongues are turned obliquely outwards and press against the bearing seat 2 with its edges 5 and they grip somewhat into the bearing seat due to the softness of the seat material. The locking ring 3 engages against the bearing ring 1 and will retain this in clamped position.

Figure 2:
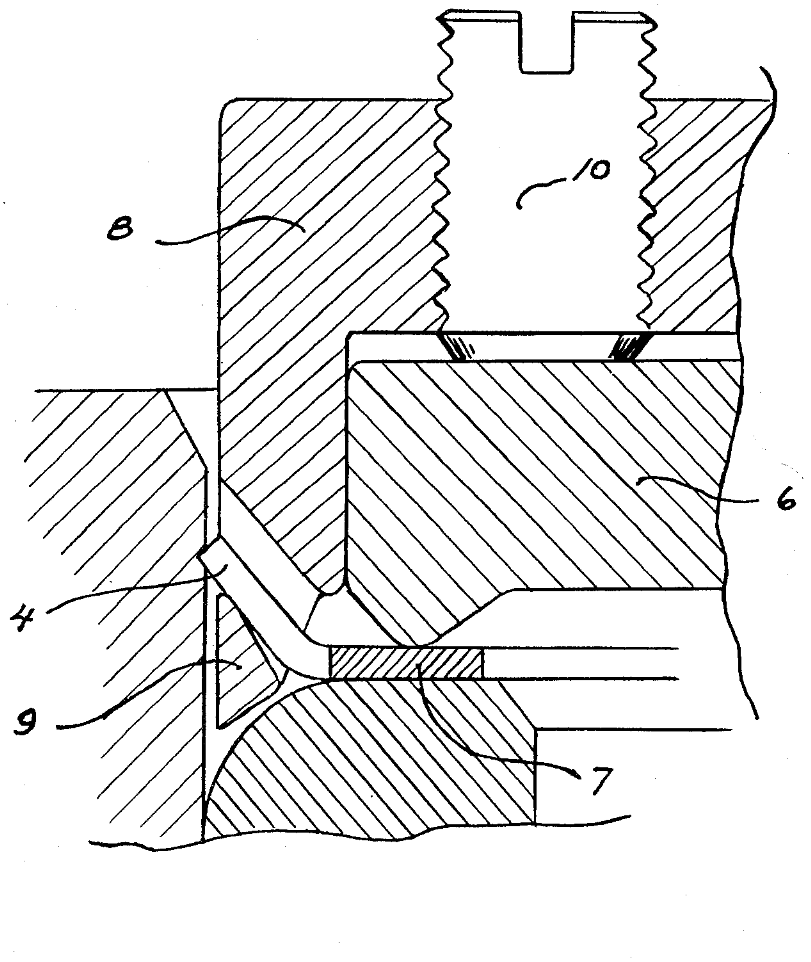
FIG. 2 shows in a section the dismantling tool fitted to the locking ring.

In FIG. 2 is shown the dismantling tool fitted to the locking ring. This tool includes a stop 6, which engages against the portion 7 of the locking ring, located radially inside the locking tongues 4.

Around the stop 6 is provided a moveable member 8 of the tool. This member 8 has been provided with teeth 9, which can be introduced between the locking tongues 4 and be brought in under these. The tool has been provided with threaded screws 10 in order to make possible a displacement betweeen the tool members 6 and 8.

Figure 3:
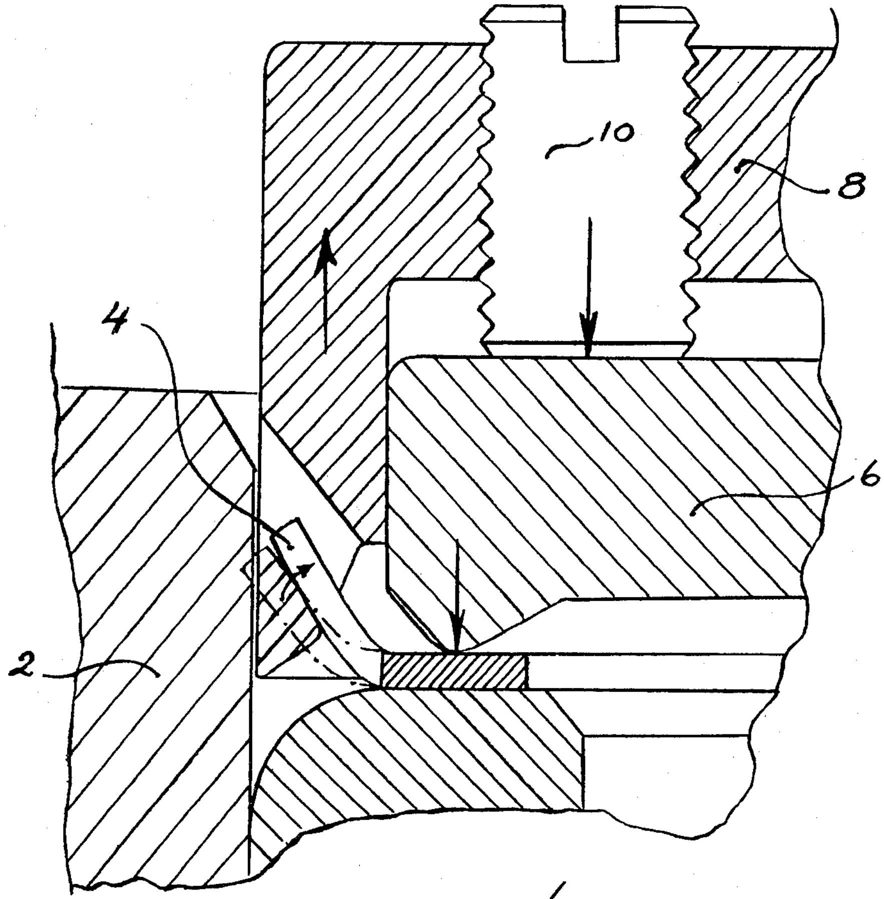
FIG. 3 is a section of a dismantling tool together with the removed locking ring.

In FIG. 3 is shown the function of the tool. The screws 10 have been tightened which means that the moveable tool member 8 will raise in relation to the stop 6. Thereby are the locking tongues 4 bent upwards and inwards and they will thereby lose the grip against the bearing seat 2. The tool and the locking ring thereupon can be removed without resistance.

Figure 4:
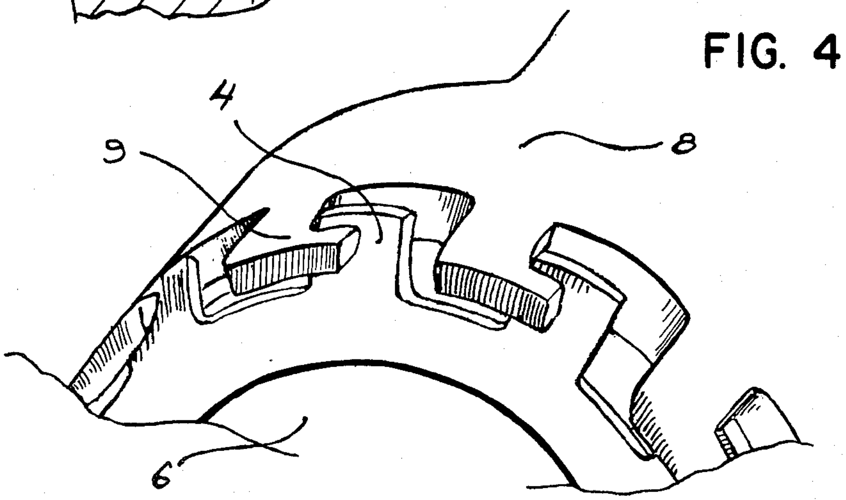
FIG. 4 shows in a perspective view the dismantling tool together with the removed locking ring.

FIG. 4 finally shows the tool as seen in perspective. The moveable member 8, the grabbing teeth 9 of which has been inserted below the locking tongues 4 has been urged away from the stop 6. The locking tongues 4 thereby have been bent inwards and they are now as shown situated radially inside the circumference of the tool member 8.

The invention has been shown in connection to an outer ring of a bearing, at which sufficient space for insertion of the grabbing teeth 9 is at hand. This is due to the fact that the bearing ring is chamfered. The invention can of course be used in connection to other machine members but it must be ascertained that there is enough space for the insertion of the grabbing teeth below the locking tongues.

The invention is not limited to the embodiment shown but can be modified in several ways within the scope of the claims.

I claim:

1. A tool for dismantling a locking ring consisting of an annular portion having a plurality of radially projecting circumferentially spaced locking tongues for supporting a bearing element such as a ring in an opening in a housing or the like, the annular portion seating against the axial end face of the bearing element and the tongues wedging against the sidewall of the housing at an angle, said tool comprising a generally disc-like member having rib means depending from one axial face thereof adapted to abut the annular portion of said locking ring radially inwardly of the locking tongues, an outer member having a depending flange closely circumscribing the outer sidewall of said disc member of a diameter slightly smaller than the opening in the housing having a plurality of circumferentially spaced teeth having gripping elements adapted to engage through the spaces between tongues of the locking ring and upon rotation confront the back of the tongues and means for axially displacing the gripping member axially relative to the disc whereby the gripping elements of the teeth deform the tongues upwardly to release them from engagement with the sidewall of the opening in the housing.

2. A tool according to claim 1 wherein the displacing means consists of at least one threaded bolt engaging through a threaded opening through the outer member abutting said disc-like member.

* * * * *